United States Patent [19]

Esswein

[11] 4,362,365

[45] Dec. 7, 1982

[54] ACHROMATIC MICROSCOPE OBJECTIVE

[75] Inventor: Karlheinz Esswein, Aalen-Unterkochen, Fed. Rep. of Germany

[73] Assignee: Carl Zeiss-Stiftung, Heidenheim on the Brenz, Fed. Rep. of Germany

[21] Appl. No.: 241,813

[22] Filed: Mar. 9, 1981

Related U.S. Application Data

[63] Continuation-in-part of Ser. No. 97,536, Nov. 26, 1979, abandoned, which is a continuation-in-part of Ser. No. 900,694, Apr. 27, 1978, abandoned.

[51] Int. Cl.³ .............................................. G02B 21/02
[52] U.S. Cl. ..................................................... 350/414
[58] Field of Search ............................... 350/414, 478

[56] References Cited
U.S. PATENT DOCUMENTS

| | | | |
|---|---|---|---|
| 3,476,462 | 11/1969 | Benford | 350/414 X |
| 3,592,530 | 7/1971 | Klein | 350/414 |
| 3,982,821 | 9/1976 | Shoemaker | 350/414 |
| 3,989,317 | 11/1976 | Maeda | 350/478 |
| 4,002,407 | 1/1977 | Maeda | 350/414 X |
| 4,027,951 | 6/1977 | Mori et al. | 350/414 |
| 4,212,515 | 7/1980 | Itaya | 350/414 |

Primary Examiner—John K. Corbin
Assistant Examiner—Scott J. Sugarman
Attorney, Agent, or Firm—Stonebraker, Shepard & Stephens

[57] ABSTRACT

An achromatic microscope objective having three lens components. The first and second components are individual positive lens elements and the third component is a cemented doublet made up of a negative element and a biconvex positive element. The objective is characterized by a particularly advantageous selection of the glasses used for the respective elements. The first or front element has an index of refraction in the range of 1.55 to 1.70 and an Abbe number in the range of 45 to 68; the second element has these same ranges; the third element (negative element of the doublet) has an index of refraction in the range of 1.65 to 1.97 and an Abbe number in the range of 20 to 40; and the fourth element (positive element of the doublet) has an index of refraction in the range of 1.46 to 1.57 and an Abbe number in the range of 50 to 85. By using glasses having these characteristics, it is possible to produce at modest expense a microscope objective with very good correction of all image errors.

8 Claims, 4 Drawing Figures ion 4, 5 is a cemented doublet, in which lens element 4 is a biconcave negative lens and lens element 5 is a biconvex positive lens.

ACHROMATIC MICROSCOPE OBJECTIVE

CROSS REFERENCE TO RELATED APPLICATIONS

This application is a continuation-in-part of application Ser. No. 097,536, filed Nov. 26, 1979, now abandoned, which application, in turn, is a continuation of application Ser. No. 900,694, filed Apr. 27, 1978, now abandoned.

BACKGROUND OF THE INVENTION

The invention relates to an achromatic microscope objective having a magnification within the range of 35 to 45 times, and a numerical aperture of more than 0.60, the objective consisting of three components of which the first is a positive component and the third is a cemented doublet formed from a negative element and a biconvex element.

More than fifteen years ago, a microscope objective known as a Planachromat 10/0.22 was on the market. This consisted of three lens components, with a collecting first component and second component, and a third cemented component. The advantage of a construction with only four lenses, obtained in the case of this objective having a small magnification of 10× and the relatively small aperture of 0.22 could not, until now, be transferred to a microscope objective of larger aperture and higher magnification and therefore short focal length.

There have been many attempts to construct achromatic microscope objectives of as few lens elements as possible. Objectives consisting of five elements and sometimes of six elements are known, but such objectives are relatively expensive. For example, German Pat. No. 2,424,399 discloses a microscope objective having a magnification of 40× and a numerical aperture of 0.65, and this consists of three components having a total of five elements. In this construction, the first component is a collecting individual element, while both the second and third components are cemented components having a negative and a biconvex collecting element. In this known objective, the refractive power required for the formation of a real image is distributed over three collecting lenses. In order to compensate for the spherical aberration and the negative chromatic axial aberration produced by them, two diverging lenses are provided.

This known objective is relatively expensive, as a result of the use of a total of five lens elements. Furthermore it requires a relatively high expenditure of manufacturing technique in order to produce the two cemented components.

The object of the present invention is to provide a relatively low cost achromatic microscope objective having a magnification within the range of 35 to 45×, and a numerical aperture greater than 0.60, so designed that good correction of all image errors is provided with the use of only low cost mass produced glasses, and which can be built with only relatively low manufacturing expenditure.

The invention starts from an objective in which the first and second components are positive single elements and the third component is a cemented doublet made up of a negative element and a biconvex collecting lens, and it is characterized by the proper choice of the glasses used in the respective elements. The second component is developed as a collecting single element with a refractive index $n_d$ within the range of 1.55 to 1.70 and an Abbe number $v_d$ within the range of 45 to 68. By way of example, glass obtainable under the designation SK 16 can be used for this lens. Glass of this designation is shown in the glass catalog of the glass manufacturing firm of Jaener Glasswerk Schott & Genossen, of Mainz, Germany.

This development makes it possible to keep the spherical aberration and the negative chromatic axial aberration caused by the total of three collecting lenses so slight that dependable compensation is possible by using merely one diverging lens. The diverging lens which is present in the third component is made of glass having an index of refraction $n_d$ within the range of 1.65 to 1.97 and an Abbe number $v_d$ within the range of 20 to 40, that is to say, made of material having a high refractive index and low Abbe number. For this, glass available under the designation SF 56 in the above mentioned glass catalog can be used, for example.

The biconvex positive lens cemented to this diverging lens to form the doublet is made of material having a low refractive index, within the range of 1.46 to 1.57, and a relatively high Abbe number within the range of 50 to 85. For this element, glass obtainable under the designation K7 in the above mentioned glass catalog can be used, for example.

The front or first component is made of material having a refractive index $n_d$ within the range of 1.55 to 1.70 and an Abbe number $v_d$ within the range of 45 to 68. Glass available under the designation SK 2 in the above mentioned glass catalog can be used, for example. Preferably this front lens element is of concave-convex curvature and has a center thickness which can still be easily produced from a manufacturing standpoint.

In order to obtain the desired chromatic magnification difference, the air space between the second single component and the third lens component is so selected, according to the invention, that it is less than 0.8 F, where F is the equivalent focal length of the objective.

The microscope objective of the present invention is characterized particularly by the fact that, with full utilization of the selection of low priced mass produced glasses possible from glass catalogs, a dependable correction of image defects is obtained with the use of only four lens elements, while the cost of manufacture is maintained relatively low.

DESCRIPTION OF THE PREFERRED EMBODIMENT

Figure 1:
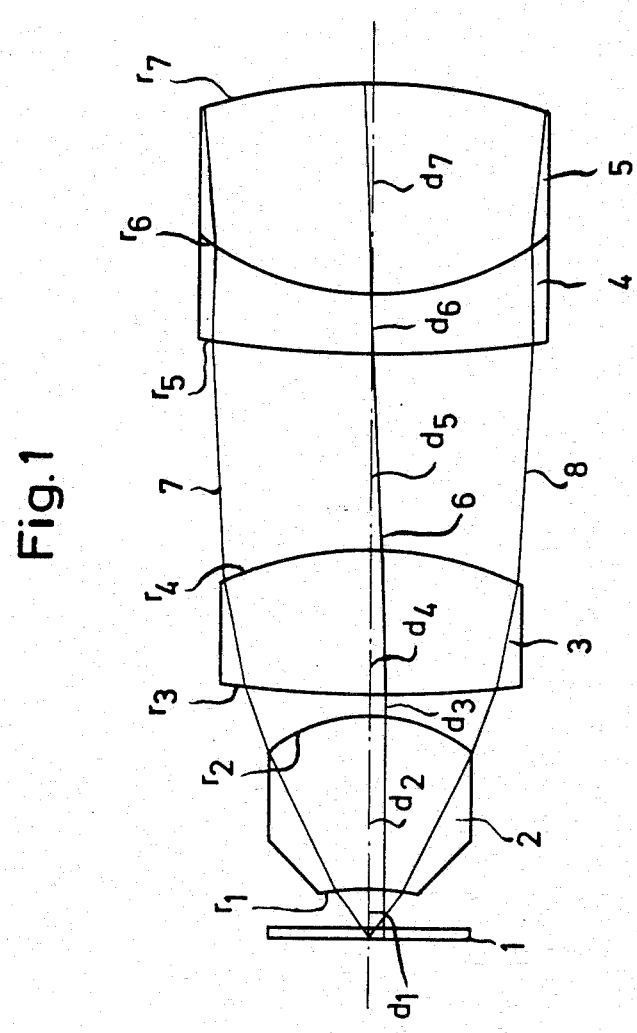
FIG. 1 is a lens diagram of a microscope objective in accordance with a preferred embodiment of the invention, illustrating an objective with a magnification of 40× and a numerical aperture of 0.65.

Referring first to FIG. 1, the conventional cover glass is shown at 1 and has the customary thickness of 0.17 mm. The first lens element 2 of the objective is a concavo-convex collecting lens, which is followed by the second component 3, also formed as a single element and it is a biconvex collecting lens. The third component is formed as a cemented component or doublet, made up of a negative element 4 and a biconvex positive element 5. In order to indicate the path of the light, the main beam 6 as well as the center pencil defined by the rays 7 and 8 have been shown in the drawing.

The following data table gives the numerical values applicable to a microscope objective according to a preferred embodiment of the invention, using the usual symbols and notations customarily found in lens patents. As usual, r indicates the radius, the particular surface being identified by the subscript, numbering the surfaces consecutively from front to rear. The letter d is used to indicate thicknesses and spacings, with a subscript identifying the particular thickness or spacing, numbered in a single consecutive series from front to rear. The index of refraction and the Abbe number are indicated in the usual way.

Figures 2, 3, 4:
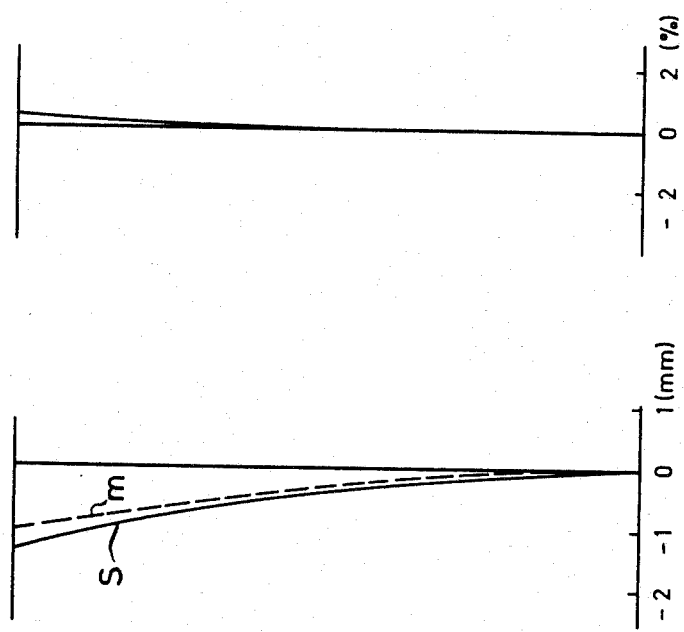
FIG. 2 shows curves for the spherical aberration of the objective according to FIG. 1.
FIG. 3 shows the curves for the astigmatism of the objective according to FIG. 1.
FIG. 4 shows the curve of the distortion of the objective according to FIG. 1.

Astigmatism is also well corrected, as shown by the curves in FIG. 3. The curvature lying between the curves s and m is improved by 30% in this new microscope objective, as compared with comparable objectives having five lens elements. The distortion is shown in the curve in FIG. 4, and it is seen from this curve that the present objective (constructed in accordance with the data in Table 1) has only a very small distortion.

These curves in FIGS. 2 to 4 show in general that according to the present invention, in spite of using only four lens elements, center correction and distortion are at least equivalent to those of comparable objectives having five elements, while the mean curvature is definitely improved.

The data for other specific embodiments of the present invention are given in the following tables. It should be understood that all numerical data, with respect to all embodiments or examples, are subject to a tolerance of plus or minus five percent.

TABLE 1

$f = 1 \; \beta = -40 \times NA = 0.65$

| Lens | Radius r | Thickness d | Spacing d | Refraction index $n_d$ | Abbe-number $v_d$ |
|---|---|---|---|---|---|
| | | | $d_1 = 0.130$ | | |
| I | $r_1 = -1.089$ | | | | |
| | | $d_2 = 0.624$ | | 1.60738 | 56.65 |
| | $r_2 = -0.640$ | | | | |
| | | | $d_3 = 0.098$ | | |
| II | $r_3 = 7.938$ | | | | |
| | | $d_4 = 0.520$ | | 1.62041 | 60.33 |
| | $r_4 = -1.371$ | | | | |
| | | | $d_5 = 0.704$ | | |
| III | $r_5 = 4.902$ | | | | |
| | | $d_6 = 0.217$ | | 1.78470 | 26.08 |
| | $r_6 = 1.105$ | | | | |
| | | $d_7 = 0.761$ | | 1.51112 | 60.41 |
| | $r_7 = -2.143$ | | | | |

As shown in FIG. 2, the spherical aberration of this objective is suitably corrected, the curves in FIG. 2 being the customary curves for spherical aberration.

TABLE 2

$f = 1 \; \beta = -35 \times NA = 0.65$

| Lens | Radius r | Thickness d | Spacing d | Refraction index $n_d$ | Abbe-number $v_d$ |
|---|---|---|---|---|---|
| | | | $d_1 = 0.140$ | | |
| I | $r_1 = -1.058$ | | | | |
| | | $d_2 = 0.623$ | | 1.60738 | 56.65 |
| | $r_2 = -0.639$ | | | | |
| | | | $d_3 = 0.098$ | | |
| II | $r_3 = 7.935$ | | | | |
| | | $d_4 = 0.519$ | | 1.62041 | 60.33 |
| | $r_4 = -1.371$ | | | | |
| | | | $d_5 = 0.690$ | | |
| III | $r_5 = 4.904$ | | | | |
| | | $d_6 = 0.192$ | | 1.78470 | 26.08 |
| | $r_6 = 1.092$ | | | | |
| | | $d_7 = 0.760$ | | 1.51112 | 60.41 |
| | $r_7 = -2.142$ | | | | |

TABLE 3

$f = 1 \; \beta = -45 \times NA = 0.65$

| Lens | Radius r | Thickness d | Spacing d | Refraction index $n_d$ | Abbe-number $v_d$ |
|---|---|---|---|---|---|
| | | | $d_1 = 0.134$ | | |
| I | $r_1 = -1.149$ | | | | |
| | | $d_2 = 0.622$ | | 1.60738 | 56.65 |
| | $r_2 = -0.646$ | | | | |
| | | | $d_3 = 0.097$ | | |
| II | $r_3 = 8.017$ | | | | |
| | | $d_4 = 0.524$ | | 1.62041 | 60.33 |
| | $r_4 = -1.385$ | | | | |
| | | | $d_5 = 0.700$ | | |
| III | $r_5 = 4.951$ | | | | |

TABLE 3-continued $f = 1 \quad \beta = -45 \times \text{NA} = 0.65$

| Lens | Radius r | Thickness d | Spacing d | Refraction index $n_d$ | Abbe-number $\nu_d$ |
|---|---|---|---|---|---|
| | | $d_6 = 0.244$ | | 1.78470 | 26.08 |
| | $r_6 = 1.116$ | | | | |
| | | $d_7 = 0.768$ | | 1.51112 | 60.41 |
| | $r_7 = -2.164$ | | | | |

TABLE 4

$F = 1 \quad \beta = -40 \times \text{NA} = 0.65$

| Lens | Radius r | Thickness d | Spacing d | Refraction index $n_d$ | Abbe-number $\nu_d$ |
|---|---|---|---|---|---|
| I | $r_1 = -0.798$ | | $d_1 = 0.155$ | | |
| | | $d_2 = 0.493$ | | 1.62014 | 63.52 (PSK53) |
| | $r_2 = -0.546$ | | | | |
| II | $r_3 = 68.959$ | | $d_3 = 0.044$ | | |
| | | $d_4 = 0.653$ | | 1.58913 | 61.27 (SK5) |
| | $r_4 = -1.106$ | | | | |
| III | $r_5 = 5.377$ | | $d_5 = 0.737$ | | |
| | | $d_6 = 0.318$ | | 1.75520 | 27.58 (SF4) |
| | $r_6 = 1.152$ | | | | |
| | | $d_7 = 0.778$ | | 1.49782 | 66.95 (BK10) |
| | $r_7 = -1.945$ | | | | |

TABLE 5

$F = 1 \quad \beta = -40 \times \text{NA} = 0.65$

| Lens | Radius r | Thickness d | Spacing d | Refraction index $n_d$ | Abbe-number $\nu_d$ |
|---|---|---|---|---|---|
| I | $r_1 = -1.057$ | | $d_1 = 0.164$ | | |
| | | $d_2 = 0.613$ | | 1.55232 | 63.46 (PSK3) |
| | $r_2 = -0.660$ | | | | |
| II | $r_3 = -51.411$ | | $d_3 = 0.027$ | | |
| | | $d_4 = 0.361$ | | 1.69680 | 55.41 (LAKN14) |
| | $r_4 = -1.188$ | | | | |
| III | $r_5 = 3.862$ | | $d_5 = 0.687$ | | |
| | | $d_6 = 0.435$ | | 1.91761 | 21.51 (SF58) |
| | $r_6 = 1.175$ | | | | |
| | | $d_7 = 0.868$ | | 1.51118 | 51.01 (TiF1) |
| | $r_7 = -1.804$ | | | | |

TABLE 6

$F = 1 \quad \beta = -40 \times \text{NA} = 0.65$

| Lens | Radius r | Thickness d | Spacing d | Refraction index $n_d$ | Abbe-number $\nu_d$ |
|---|---|---|---|---|---|
| I | $r_1 = -1.373$ | | $d_1 = 0.155$ | | |
| | | $d_2 = 0.651$ | | 1.55232 | 63.46 (PSK3) |
| | $r_2 = -0.669$ | | | | |
| II | $r_3 = 17.657$ | | $d_3 = 0.035$ | | |
| | | $d_4 = 0.536$ | | 1.69680 | 55.41 (LAKN14) |
| | $r_4 = -1.380$ | | | | |
| III | $r_5 = 3.765$ | | $d_5 = 0.631$ | | |
| | | $d_6 = 0.361$ | | 1.79504 | 28.39 (LAF9) |
| | $r_6 = 1.097$ | | | | |
| | | $d_7 = 0.853$ | | 1.48656 | 84.47 (FK51) |
| | $r_7 = -2.125$ | | | | |

What is claimed is:

1. An achromatic microscope objective with a magnification within the range of 35× and 45× and a numerical aperture greater than 0.60, the complete objective having only four lens elements forming three lens components, the first component, numbering the components consecutively from front to rear, being a single positive element, the second component also being a single positive element, and the third component being a cemented doublet consisting of a front negative element and a rear biconvex positive element, the refractive index $n_d$ and the Abbe number $\nu_d$ of each element being within the range indicated in the following table:

| | | |
|---|---|---|
| Element 1 | [1.70] $1.63 > n_d > 1.55$ | [68] $64 > v_d > 56$ [45] |
| Element 2 | $1.70 > n_d > 1.57$ [1.55] | [68] $62 > v_d > 55$ [45] |
| Element 3 | [1.97] $1.93 > n_d > 1.75$ [1.65] | [40] $29 > v_d > 21$ [20] |
| Element 4 | [1.57] $1.53 > n_d > 1.47$ [1.46] | $85 > v_d > 51$ [50] |

2. The invention defined in claim 1, wherein the air spacing between the second component and the third component is not more than 0.8 times the equivalent focal length of the objective.

3. An achromatic microscope objective as defined in claim 1, wherein the characteristics of the lens elements and their spatial relationship to each other are substantially in the proportions indicated by the data in the following table, the radii of the respective surfaces being designated by r with a numerical subscript indentifying the particular surface numbered consecutively from front to rear, the thicknesses and spacings being designated by d with a numerical subscript identifying the particular thickness or space numbered in a single series from front to rear, linear dimensions being in millimeters, the respective indices of refraction of the elements being given in the column headed $n_d$, and the Abbe numbers being given in the column headed $v_d$:

4. An achromatic microscope objective as defined in claim 1, wherein the characteristics of the lens elements and their spatial relationship to each other are substantially in the proportions indicated by the data in the following table, the radii of the respective surfaces being designated by r with a numerical subscript indentifying the particular surface numbered consecutively from front to rear, the thicknesses and spacings being designated by d with a numerical subscript identifying the particular thickness or space numbered in a single series from front to rear, linear dimensions being in millimeters, the respective indices of refraction of the elements being given in the column headed $n_d$, and the Abbe numbers being given in the column headed $v_d$:

| Lens | Radius r | Thickness d | Spacing d | Refraction index $n_d$ | Abbe-number $v_d$ |
|---|---|---|---|---|---|
| I | $r_1 = -1.058$ | | $d_1 = 0.140$ | | |
| | | $d_2 = 0.623$ | | 1.60738 | 56.65 |
| | $r_2 = -0.639$ | | | | |
| | | | $d_3 = 0.098$ | | |
| II | $r_3 = 7.935$ | | | | |
| | | $d_4 = 0.519$ | | 1.62041 | 60.33 |
| | $r_4 = -1.371$ | | | | |
| | | | $d_5 = 0.690$ | | |
| III | $r_5 = 4.904$ | | | | |
| | | $d_6 = 0.192$ | | 1.78470 | 26.08 |
| | $r_6 = 1.092$ | | | | |
| | | $d_7 = 0.760$ | | 1.51112 | 60.41 |
| | $r_7 = -2.142$ | | | | |

5. An achromatic microscope objective as defined in claim 1, wherein the characteristics of the lens elements and their spatial relationship to each other are substantially in the proportions indicated by the data in the following table, the radii of the respective surfaces being designated by r with a numerical subscript indentifying the particular surface numbered consecutively from front to rear, the thicknesses and spacings being designated by d with a numerical subscript identifying the particular thickness or space numbered in a single series from front to rear, linear dimensions being in millimeters, the respective indices of refraction of the

| Lens | Radius r | Thickness d | Spacing d | Refraction index $n_d$ | Abbe-number $v_d$ |
|---|---|---|---|---|---|
| I | $r_1 = -1.089$ | | $d_1 = 0.130$ | | |
| | | $d_2 = 0.624$ | | 1.60738 | 56.65 |
| | $r_2 = -0.640$ | | | | |
| | | | $d_3 = 0.098$ | | |
| II | $r_3 = 7.938$ | | | | |
| | | $d_4 = 0.520$ | | 1.62041 | 60.33 |
| | $r_4 = -1.371$ | | | | |
| | | | $d_5 = 0.704$ | | |
| III | $r_5 = 4.902$ | | | | |
| | | $d_6 = 0.217$ | | 1.78470 | 26.08 |
| | $r_6 = 1.105$ | | | | |
| | | $d_7 = 0.761$ | | 1.51112 | 60.41 |
| | $r_7 = -2.143$ | | | | | elements being given in the column headed $n_d$, and the Abbe numbers being given in the column headed $v_d$:

| Lens | Radius r | Thickness d | Spacing d | Refraction index $n_d$ | Abbe-number $v_d$ |
|---|---|---|---|---|---|
| I | $r_1 = -1.149$ | | $d_1 = 0.134$ | | |
| | | $d_2 = 0.622$ | | 1.60738 | 56.65 |
| | $r_2 = -0.646$ | | | | |

-continued

| Lens | Radius r | Thickness d | Spacing d | Refraction index $n_d$ | Abbe-number $\nu_d$ |
|---|---|---|---|---|---|
| | | | $d_3 = 0.097$ | | |
| II | $r_3 = 8.017$ | | | | |
| | | $d_4 = 0.524$ | | 1.62041 | 60.33 |
| | $r_4 = -1.385$ | | | | |
| | | | $d_5 = 0.700$ | | |
| III | $r_5 = 4.951$ | | | | |
| | | $d_6 = 0.244$ | | 1.78470 | 26.08 |
| | $r_6 = 1.116$ | | | | |
| | | $d_7 = 0.768$ | | 1.51112 | 60.41 |
| | $r_7 = -2.164$ | | | | |

6. An achromatic microscope objective as defined in claim 1, wherein the characteristics of the lens elements and their spatial relationship to each other are substantially in the proportions indicated by the data in the following table, the radii of the respective surfaces being designated by r with a numerical subscript indentifying the particular surface numbered consecutively from front to rear, the thicknesses and spacings being designated by d with a numerical subscript identifying the particular thickness or space numbered in a single series from front to rear, linear dimensions being in millimeters, the respective indices of refraction of the elements being given in the column headed $n_d$, and the Abbe numbers being given in the column headed $\nu_d$:

| Lens | Radius r | Thickness d | Spacing d | Refraction index $n_d$ | Abbe-number $\nu_d$ |
|---|---|---|---|---|---|
| | | | $d_1 = 0.164$ | | |
| I | $r_1 = -1.057$ | | | | |
| | | $d_2 = 0.613$ | | 1.55232 | 63.46 |
| | $r_2 = -0.660$ | | | | |
| | | | $d_3 = 0.027$ | | |
| II | $r_3 = -51.411$ | | | | |
| | | $d_4 = 0.361$ | | 1.69680 | 55.41 |
| | $r_4 = -1.188$ | | | | |
| | | | $d_5 = 0.687$ | | |
| III | $r_5 = 3.862$ | | | | |
| | | $d_6 = 0.435$ | | 1.91761 | 21.51 |
| | $r_6 = 1.175$ | | | | |
| | | $d_7 = 0.868$ | | 1.51118 | 51.01 |
| | $r_7 = -1.804$ | | | | |

7. An achromatic microscope objective as defined in claim 1, wherein the characteristics of the lens elements and their spatial relationship to each other are substantially in the proportions indicated by the data in the following table, the radii of the respective surfaces being designated by r with a numerical subscript indentifying the particular surface numbered consecutively from front to rear, the thicknesses and spacings being designated by d with a numerical subscript identifying the particular thickness or space numbered in a single series from front to rear, linear dimensions being in millimeters, the respective indices of refraction of the elements being given in the column headed $n_d$, and the Abbe numbers being given in the column headed $\nu_d$:

| Lens | Radius r | Thickness d | Spacing d | Refraction index $n_d$ | Abbe-number $\nu_d$ |
|---|---|---|---|---|---|
| | | | $d_1 = 0.155$ | | |
| I | $r_1 = -0.798$ | | | | |
| | | $d_2 = 0.493$ | | 1.62014 | 63.52 |
| | $r_2 = -0.546$ | | | | |
| | | | $d_3 = 0.044$ | | |
| II | $r_3 = 68.959$ | | | | |
| | | $d_4 = 0.653$ | | 1.58913 | 61.27 |
| | $r_4 = -1.106$ | | | | |
| | | | $d_5 = 0.737$ | | |
| III | $r_5 = 5.377$ | | | | |
| | | $d_6 = 0.318$ | | 1.75520 | 27.58 |
| | $r_6 = 1.152$ | | | | |
| | | $d_7 = 0.778$ | | 1.49782 | 66.95 |
| | $r_7 = -1.945$ | | | | |

8. An achromatic microscope objective as defined in claim 1, wherein the characteristics of the lens elements and their spatial relationship to each other are substantially in the proportions indicated by the data in the following table, the radii of the respective surfaces being designated by r with a numerical subscript indentifying the particular surface numbered consecutively

| Lens | Radius r | Thickness d | Spacing d | Refraction index $n_d$ | Abbe-number $\nu_d$ |
|---|---|---|---|---|---|
| | | | $d_1 = 0.155$ | | |
| I | $r_1 = -1.373$ | | | | |
| | | $d_2 = 0.651$ | | 1.55232 | 63.46 |
| | $r_2 = -0.669$ | | | | |
| | | | $d_3 = 0.035$ | | |
| II | $r_3 = 17.657$ | | | | |
| | | $d_4 = 0.536$ | | 1.69680 | 55.41 |
| | $r_4 = -1.380$ | | | | |
| | | | $d_5 = 0.631$ | | |
| III | $r_5 = 3.765$ | | | | |
| | | $d_6 = 0.361$ | | 1.79504 | 28.39 |
| | $r_6 = 1.097$ | | | | |
| | | $d_7 = 0.853$ | | 1.48656 | 84.47 |
| | $r_7 = -2.125$ | | | | |

\* \* \* \* \*

UNITED STATES PATENT AND TRADEMARK OFFICE
CERTIFICATE OF CORRECTION

PATENT NO. : 4,362,365
DATED : Dec. 7, 1982
INVENTOR(S) : Karlheinz Esswein

It is certified that error appears in the above-identified patent and that said Letters Patent is hereby corrected as shown below:

In the heading of the patent, insert the following:

[30] Foreign Application Priority Data

Apr. 28, 1977    [DE] Fed. Rep. of Germany       2718896

In the tabular matter in claim 1 (column 7, lines 4-7) omit all of the square brackets and the numerals within the square brackets, so that the tabular matter as corrected will read:

Element 1    $1.63 > n_d > 1.55$      $64 > v_d > 56$

Element 2    $1.70 > n_d > 1.57$      $62 > v_d > 55$

Element 3    $1.93 > n_d > 1.75$      $29 > v_d > 21$

Element 4    $1.53 > n_d > 1.47$      $85 > v_d > 51$

*Signed and Sealed this*

*Fifteenth* Day of *July 1986*

[SEAL]

*Attest:*

*Attesting Officer*

DONALD J. QUIGG

*Commissioner of Patents and Trademarks*